US007463697B2

(12) United States Patent
Maltsev et al.

(10) Patent No.: US 7,463,697 B2
(45) Date of Patent: Dec. 9, 2008

(54) MULTICARRIER TRANSMITTER AND METHODS FOR GENERATING MULTICARRIER COMMUNICATION SIGNALS WITH POWER AMPLIFIER PREDISTORTION AND LINEARIZATION

(75) Inventors: Alexander A. Maltsev, Nizhny Novgorod (RU); Ali S. Sadri, San Diego, CA (US); Oleg V. Poldin, Nizhny Novgorod (RU); Alexander A. Maltsev, Jr., Nizhny Norgorod (RU)

(73) Assignee: Intel Corporation, Santa Clara, CA (US)

( * ) Notice: Subject to any disclaimer, the term of this patent is extended or adjusted under 35 U.S.C. 154(b) by 788 days.

(21) Appl. No.: 10/953,206

(22) Filed: Sep. 28, 2004

(65) Prior Publication Data

US 2006/0067426 A1 Mar. 30, 2006

(51) Int. Cl.
*H04K 1/02* (2006.01)
*H04L 25/03* (2006.01)
*H04L 25/49* (2006.01)

(52) U.S. Cl. .................. 375/297; 375/260; 375/295; 375/296; 455/91; 455/112.3

(58) Field of Classification Search ............ 375/295, 375/296, 297, 300, 260; 455/91, 114.2, 114.3, 455/126
See application file for complete search history.

(56) References Cited

U.S. PATENT DOCUMENTS 6,240,278 B1 * 5/2001 Midya et al. ............... 455/126

7,035,601 B2 * 4/2006 Karjalainen et al. ....... 455/114.3
7,106,806 B1 * 9/2006 Kenington ................. 375/297
7,266,159 B2 * 9/2007 Vella-Coleiro ............. 375/296

OTHER PUBLICATIONS

"Supplement to IEEE Standard for Information Technology- Telecommunications and Information Exchange Between Systems-Local and Metropolitan Area Networks—Specific Requirements—Part 11: Wireless LAN Medium Access Control (MAC) and Physical Layer (PHY) Specifications—High-Speed Physical Layer in the 5 GHz Band", *IEEE Std. 802.11a-1999*, IEEE Computer Society, New York, NY, (1999, reaffirmed Jun. 12, 2003), 91 pgs.
Dinis, R., et al., "On the Performance Evaluation of OFDM Transmission Using Clipping Techniques", *IEEE VTS 50th Vehicular Technology Conference (VTC 1999—Fall)*, vol. 5, (Sep. 1999), 2923-2928.
Kenington, P. B., "Chapter 6—Predistortion Techniques", *In: High-Linearity RF Amplifier Design*, Artech House, Inc., Norwood, MA,(2000), 351-423.
Li, X., et al., "Effects of Clipping and Filtering on the Performance of OFDM", *IEEE Communications Letters*, 2(5), (May 1998), 131-133.
Raab, F. H., "Power Amplifiers and Transmitters for RF and Microwave", *IEEE Transactions on Microwave Theory and Techniques*, 50(3), (Mar. 2002), 814-826.
Van Nee, R., "Chapter 2—OFDM Basics", *In: OFDM Wireless Multimedia Communications*, Artech House, (2000), 33-51.

* cited by examiner

*Primary Examiner*—Ted Wang
(74) *Attorney, Agent, or Firm*—Schwegman, Lundberg & Woessner, P.A.; Gergory J. Gorris

(57) ABSTRACT

A multicarrier signal is generated by pre-compensating frequency-domain subcarrier symbols for substantially linear distortion subsequently introduced by a time-domain baseband filter.

24 Claims, 4 Drawing Sheets

MULTICARRIER TRANSMITTER

US 7,463,697 B2

MULTICARRIER TRANSMITTER AND METHODS FOR GENERATING MULTICARRIER COMMUNICATION SIGNALS WITH POWER AMPLIFIER PREDISTORTION AND LINEARIZATION

TECHNICAL FIELD

Embodiments of the present invention pertain to electronic communications. Some embodiments pertain to wireless local area networks (WLANs). Some embodiments pertain to multicarrier transmitters. Some embodiments pertain to signal predistortion for power amplifier linearization.

BACKGROUND

Power amplifiers used in many wireless transmitters introduce non-linear distortion to the signal when operating near maximum output. Non-linearity is inherent to power amplifiers. In-band distortion changes the spectral components in the original signal frequency band, while out-of-band distortion causes expansion of the signal spectrum into adjacent channels causing interference with other users. Multicarrier communications, especially orthogonal frequency division multiplexed (OFDM) communications, are sensitive to non-linear distortion because of the high number of independently modulated and closely spaced subcarriers, which generally have a high peak-to-average power ratio (PAPR). To avoid in-band and out-of-band distortion, a power amplifier may be operated in a more-linear region; however this is extremely inefficient from a power consumption perspective making linear operation unsuitable for many battery-powered devices.

Thus there are general needs for systems and methods for power amplifier linearization that allow a power amplifier to operate efficiently while generating less in-band and out-of-band distortion.

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. Embodiments of the invention set forth in the claims encompass all available equivalents of those claims. Embodiments of the invention may be referred to, individually or collectively, herein by the term "invention" merely for convenience and without intending to voluntarily limit the scope of this application to any single invention or inventive concept if more than one is in fact disclosed.

Figure 1:
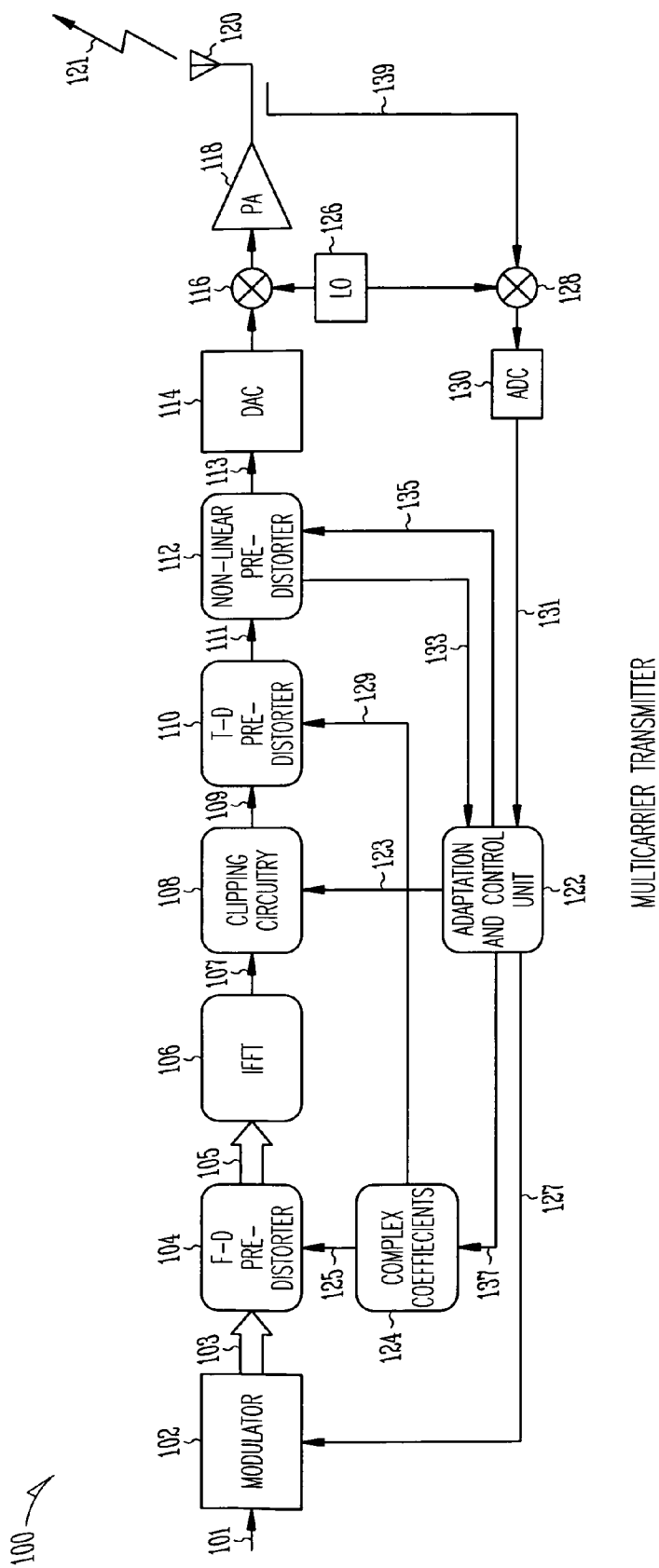
FIG. 1 is a functional block diagram of a multicarrier transmitter in accordance with some embodiments of the present invention.

FIG. 1 is a functional block diagram of a multicarrier transmitter in accordance with some embodiments of the present invention. Multicarrier transmitter 100 may implement predistortion and linearization techniques that may allow its power amplifier to operate more efficiently while generating less in-band and out-of-band distortion. Multicarrier transmitter 100 may include modulator 102 to modulate groups of bits of bit stream 101 to generate a plurality of subcarrier symbols 103. Multicarrier transmitter 100 may also include adaptation and control unit 122. In some embodiments, modulator 102 may generate subcarrier symbols 103 based on modulation type and coding rate input 127 provided by adaptation and control unit 122. Modulator 102 may generate one of subcarrier symbols 103 for each subcarrier of a plurality of subcarriers of a multicarrier channel.

Multicarrier transmitter 100 also comprises frequency-domain predistorter 104 to multiply complex amplitudes of a multicarrier symbol by complex coefficients 125. Multicarrier transmitter 100 also comprises inverse fast Fourier transform (IFFT) circuitry 106 to generate time-domain baseband signal 107 from frequency-domain output 105 of frequency-domain predistorter 104, and clipping circuitry 108 to reduce signal peaks of time-domain baseband signal 107. Multicarrier transmitter 100 also comprises time-domain predistorter 110 to perform low-pass filtering on time-domain baseband signal 109 based on complex coefficients 129. Frequency-domain predistorter 104 may be a frequency-domain filter, and time-domain predistorter 110 may be a time-domain filter. Complex coefficients 125 and complex coefficients 129 may be provided by adaptation and control unit 122.

Multicarrier transmitter 100 also comprises non-linear predistorter 112 to generate predistorted signal 113, digital-to-analog converter (DAC) 114 to convert predistorted signal 113 to analog, mixer 116 to upconvert the signal based on a local-oscillator signal provided by local oscillator (LO) 126, and power amplifier 118 to amplify the upconverted signal for transmission by antenna 120. Multicarrier transmitter 100 may also include mixer 128 to downconvert sampled output signal 139 and analog-to-digital converter (ADC) 130 to digitize the sampled and downconverted output signal to generate downconverted and digitized sampled output 131.

Adaptation and control unit 122 may provide predistortion control signal 135 to non-linear predistorter 112 to adjust a predistorted signal maximum of signal 113. In some embodiments, adaptation and control unit 122 may adjust the predistorted signal maximum of signal 113 based on a saturation level of power amplifier 118, which may be determined, at least in part, by sampled output 131, although the scope of the invention is not limited in this respect. This is discussed in more detail below.

The multicarrier symbol generated by modulator 102 may comprise a plurality of subcarrier symbols 103. Each subcarrier symbol 103 may be associated with one of a plurality of subcarriers of a multicarrier communication signal that may be subsequently transmitted by antenna 120. In some embodiments, one of complex coefficients 125 may be provided for each subcarrier of the multicarrier channel, although the scope of the invention is not limited in this respect.

In some embodiments, multicarrier transmitter 100 may be an orthogonal frequency division multiplexed (OFDM) transmitter. In these embodiments, the multicarrier symbol may be an OFDM symbol comprising a plurality of subcarrier symbols 103 corresponding to symbol-modulated subcarriers that may be subsequently transmitted by antenna 120. In these embodiments, multicarrier transmitter 100 may comprise radio-frequency (RF) circuitry to generate multicarrier or OFDM signal 121 comprising a plurality of substantially orthogonal symbol-modulated subcarriers.

Frequency-domain predistorter 104 may perform a substantially linear transformation by multiplying (in the frequency domain) a complex amplitude of each of subcarrier symbols 103 by an associated one of complex coefficients 125. In these embodiments, time-domain predistorter 110 may perform a substantially linear transformation (in the time domain) on time-domain baseband signal 109 providing a frequency transfer function inverse to that of frequency-domain predistorter 104.

Complex coefficients 125 may be selected to provide a frequency transfer function of frequency-domain predistorter 104 approximately inverse to a frequency transfer function of time-domain predistorter 110 for in-band signal components. Complex coefficients 125 may be selected to substantially, or at least in part, correct for linear distortion subsequently introduced by time-domain predistorter 110. Linear distortion may change the relationship of the magnitude and phases of the subcarriers that comprise the signal. The combination of frequency-domain predistortion introduced by frequency-domain predistorter 104, non-linear distortion introduced by clipping circuitry 108 and time-domain predistortion introduced by time-domain predistorter 110 may help multicarrier transmitter 100 achieve a spectral flatness within a range to help meet some wireless local area network (WLAN) standards, although the scope of the invention is not limited in this respect. In some embodiments, frequency-domain predistorter 104 may at least in part, compensate for in-band linear distortion introduced by time-domain predistorter 110. In these embodiments, the low-pass filtering performed by the time-domain predistorter 110 may help suppress out-of-band components in time-domain baseband signal 109 that may have resulted from the operation of clipping circuitry 108.

In some embodiments, adaptation and control unit 122 may provide different sets of coefficients 125 to frequency-domain predistorter 104 and different corresponding sets of coefficients 129 to time-domain predistorter 110 for different modulation types associated with the subcarrier symbols 103. In these embodiments, sets of coefficients 125 and 129 may be selected for specific modulation types. In some embodiments, coefficients 125 & 129 may be selected to suppress of out-of-band components to help meet transmit spectrum mask requirements that may be imposed by some wireless communication standards, although the scope of the invention is not limited in this respect.

Clipping circuitry 108 may clip input baseband signal 108 based on clipping level input 123. In these embodiments, signals modulated with low-order modulation types (e.g., binary phase shift keying (BPSK) and quadrature phase shift keying (QPSK)) and/or low coding rates may be clipped with a smaller ratio of the clipping level to the average signal power in comparison with signals with higher-order modulation types and/or higher coding rates. The smaller that the ratio of the clipping level is to the average signal power of signal 107, the larger the power of out-of-band distortions will be in signal 109 that results from clipping. The suppression of out-of-band components of different levels may be used to select of different set of coefficients 129 for time-domain predistorter 110. In some embodiments, adaptation and control unit 122 may manage the trade-off between in-band linear distortion caused by time-domain predistorter 110 and the degree of out-of-band suppression provided by time-domain predistorter 110, although the scope of the invention is not limited in this respect. To enhance performance, in some embodiments, different sets of coefficients 125 & 129 may be used for different clipping levels, although the scope of the invention is not limited in this respect.

Clipping circuitry 108 may reduce signal peaks by clipping time-domain baseband signal 107 based on clipping level input 123. A "clipped" time-domain baseband signal (i.e., signal 109) may have a reduced peak-to-average power ratio (PAPR) in comparison with signal 107. Lower clipping levels may result in larger degree of PAPR reduction. The clipping level may be selected based on the modulation type and/or the coding rate used. A larger PAPR reduction may result in larger signal distortion for both in-band and out-of-band signal components. Lower PAPR, however, may enable a higher transmitted power. For higher order modulation types and/or the higher coding rates, larger distortions may be more easily corrected at the receiver, so signals with lower order modulation types (e.g., BPSK and QPSK modulation) and lower coding rates may be clipped at a lower clipping level in comparison with signals modulated at higher order modulation types (e.g., 16-QAM and 64-QAM). The clipping performed by circuitry 108 and time-domain filtering performed by time-domain predistorter 110 may reduce the PAPR of baseband signal 107 by implementing this PAPR reduction scheme, although the scope of the invention is not limited in this respect.

Multicarrier transmitter 100 may further comprise coefficient storage element 124 to store complex coefficients 125 for use by frequency-domain predistorter 104 and complex coefficients 129 for use by time-domain predistorter 110. The complex coefficients 125 may be different for at least some of the subcarriers. Different complex coefficients may be provided by coefficient storage element 124 for each subcarrier or for sets of subcarriers, although the scope of the invention is not limited in this respect. In some embodiments, different sets of complex coefficients 125 for use by frequency-domain predistorter 104 and different sets of complex coefficients 129 for use by time-domain predistorter 110 may be stored in storage element 124 for each modulation type that may be used by modulator 102 and/or different clipping levels used by clipping circuitry 108, although the scope of the invention is not limited in this respect. Control signal 137 may be provided by adaptation and control unit 122 to select appropriate set of coefficients. Coefficient storage element 124 may comprise almost any type of a non-volatile storage element including, for example, semiconductor memory, although the scope of the invention is not limited in this respect.

After the operation of clipping circuitry 108 and the operation of time-domain predistorter 110, non-linear predistorter 112 may operate on signal 111 to generate signal 113. In accordance with some embodiments of the present invention, adaptation and control unit 122 may provide predistortion control signal 135 to non-linear predistorter 112 to adjust a predistorted signal maximum of signal 113 based on a saturation level of power amplifier 118. The predistorted signal maximum selected for signal 113 (i.e., the maximum signal level of signal 113) may determine the maximum input signal level to power amplifier 118. When the predistorted signal maximum is adjusted, the maximum input signal level of the power amplifier is also set. In some embodiments, the maximum input signal level of the power amplifier may be set a maximum power amplifier output which may be a predetermined proportion of the power amplifier's saturation level. In some embodiments, the maximum output level of power amplifier 118 may be set high (e.g., 95-99% of the saturation level of the power amplifier) when power amplifier 118 has a small saturation level relative to a desired or needed transmit power level. In some embodiments, maximum output level of power amplifier 118 may be set lower (e.g., 50-70% of the saturation level) when power amplifier 118 has a larger saturation level relative to a desired or needed transmit power level. In some embodiments, as the saturation level of power amplifier 118 increases, the predistorted signal maximum may also be increased so that the proportion between the saturation level and the maximum output of power amplifier 118 may remain about the same. In some embodiments, the predistorted signal maximum of signal 113 may be adjusted or updated by adaptation and control unit 122 after the transfer function of power amplifier 118 is measured by adaptation and control unit 122 using sampled output 131.

In some embodiments, the saturation level and the transfer function of power amplifier 118 may be measured during a calibration process. In an "on-line" (transmission) calibration mode, adaptation and control unit 122 may determine the transfer function based on comparing signal 133, which may correspond to signal 113, to sampled output signal 131. In an "off-line" (no air transmission) calibration mode, adaptation and control unit 122 may determine the transfer function based on predetermined calibration signals. In other embodiments, the saturation level and the transfer function of power amplifier 118 may be determined from a look-up table. In these embodiments, the look up table may be generated from parameters such as power amplifier temperature and supply voltage using measurements made at manufacturing, although the scope of the invention is not limited in this respect.

Accordingly, non-linear predistorter 112 may pre-distort digital signal output 111 provided by time-domain predistorter 110 to, at least in part, compensate for non-linear distortion introduced subsequently by power amplifier 118. Non-linear predistorter 112 may perform a non-linear transformation on an input complex signal (i.e., digital signal 111) using predistortion coefficients stored in a look-up table of a memory structure (not separately illustrated). In some embodiments, these predistortion coefficients may be complex and may provide compensation for both AM-AM and AM-PM non-linear distortion. As used herein, AM refers amplitude modulation, and PM refers to phase modulation. In some other embodiments, the predistortion coefficients may be real and may provide compensation for AM-AM distortion. In other embodiments, non-linear predistorter 112 may perform a non-linear transform using a polynomial expansion of a predistortion function, which may be an inverse function of the power amplifier's transfer function, although the scope of the invention is not limited in this respect.

In some embodiments, time-domain predistorter 110 may be a Gaussian filter which may have a step response function (i.e., a response to a unit step input) that may be a monotonically increasing function. In other embodiments, filters with some small ripple in their step response function may also be used as time-domain predistorter 110. The maximum magnitude of the ripple may be taken into account for calculating the predistorted signal maximum of signal 113 at the output of non-linear predistorter 112, although the scope of the invention is not limited in this respect. Adaptation and control unit 122 may adjust the predistorted signal maximum by providing predistortion control signal 135 so that a predistorted signal output of the non-linear predistorter 112 (i.e., signal 113) drives the maximum output level of power amplifier 118 to a predetermined percent of its saturation level. The predetermined percent may range from 50% to 99%, although the scope of the invention is not limited in this respect. The predistorted signal maximum may be adjusted so that predistorted signal output level of non-linear predistorter 112 doesn't completely saturate power amplifier 118 and that the output level of power amplifier 118 is within the predetermined percent of the saturation level.

The transfer function of power amplifier 118 may change due to temperature or voltage supply variations and/or over time. In some embodiments, revised predistortion coefficients of non-linear predistorter 112 may be used. Furthermore, a revised predistorted signal maximum may be determined by adaptation and control unit 122 as the power amplifiers transfer function changes to help maintain the operation of power amplifier 118 within the predetermined percentage of saturation. In some embodiments, the revised predistortion coefficients may be stored in a look-up table. In other embodiments, the revised coefficients of a polynomial expansion of the predistortion function may be stored in the look-up table, although the scope of the invention is not limited in this respect.

In some embodiments, adaptation and control unit 122 may generate predistortion control signal 135 by comparing downconverted and digitized sampled output 131 from power amplifier 118 with predistorted signal output 113 (i.e., which may be provided as signal 133) to determine an amount of distortion introduced by power amplifier 118 to compensate, at least in part, for the non-linear distortion introduced by power amplifier 118. In some embodiments, adaptation and control unit 122 may generate predistortion control signal 135 by comparing downconverted and digitized sampled output 131 from power amplifier 118 with signal 111 (i.e., provided as signal 133) to determine an amount of residual distortion from both non-linear predistorter 112 and power amplifier 118 which was non-compensated for by non-linear predistorter 112.

In some embodiments, IFFT circuitry 106 may perform an interpolation by adding zeros to both sides of frequency-domain output 105, which may be frequency-domain samples, when an IFFT size is greater than a number of subcarriers. Alternatively, one or more interpolation filters may be used after IFFT circuitry 106, although the scope of the invention is not limited in this respect.

In some embodiments, modulator 102 may be a quadrature amplitude modulator (QAM), although the scope of the invention is not limited in this respect. In some OFDM embodiments, the multicarrier channel may comprise a 20 MHz channel having up to forty-eight or more data subcarriers and up to four or more non-data subcarriers. The subcarriers, when transmitted by antenna 120, may be closely spaced orthogonal subcarriers allowing a single OFDM symbol to be transmitted together by the data subcarriers. To achieve orthogonality between closely spaced subcarriers, the subcarriers may have a null at substantially a center frequency of the other subcarriers of the OFDM channel. Interleaving and/or encoding operations may be performed on bit stream 101 prior to operation by modulator 102.

As discussed above, adaptation and control unit 122 may select a set of coefficients 125 for frequency-domain predistorter 104 and may select a set of coefficients 129 for time-domain predistorter 110 based on the selected modulation type. Modulation types used by modulator 102 may include binary phase shift keying (BPSK), which communicates one bit per symbol, quadrature phase shift keying (QPSK), which communicates two bits per symbol, 8 PSK, which communicates three bits per symbol, 16-quadrature amplitude modulation 16-QAM, which communicates four bits per symbol, 32-QAM, which communicates five bits per symbol, 64-QAM, which communicates six bits per symbol, 128-QAM, which communicates seven bits per symbol, and 256-QAM, which communicates eight bits per symbol. Modulation types with higher data communication rates per subcarrier may also be used. For example, when modulator 102 uses BPSK modulation, a set of complex coefficients 125 may be provided to frequency-domain predistorter 104 and a corresponding set of coefficients 129 may be provided to time-domain predistorter 110. When modulator 102 is instructed to use a different modulation type, such as 64-QAM, a different set of complex coefficients 125 may be provided to frequency-domain predistorter 104 and a corresponding different set of coefficients 129 may be provided to time-domain predistorter 110.

In some embodiments, frequency-domain predistorter 104 may perform a substantially linear transformation on frequency-domain samples 103 that comprise a multicarrier symbol. Clipping circuitry 108 may perform a non-linear transformation on time-domain baseband signal 107 generated from linearly transformed frequency domain samples 105 provided by the frequency-domain predistorter 104. Time-domain predistorter 110 may perform a substantially linear transformation on clipped time-domain baseband signal 109 provided by the clipping circuitry. Non-linear predistorter 112 may perform a non-linear transformation on linearly transformed clipped time-domain signals 111 provided by the time-domain predistorter 110. Power amplifier 118 may perform a non-linear transformation by amplifying an upconverted analog version of output signals provided by the non-linear predistorter 112. In some embodiments, frequency-domain predistorter 104 and time-domain predistorter 110 may have approximately inverse frequency transfer functions (i.e., frequency response). Non-linear predistorter 112 may compensate at least in part for non-linear distortion introduced by the power amplifier 118, and a predistorted signal maximum of non-linear predistorter 112 may be adjusted to achieve a predetermined saturation level of power amplifier 118. The substantially linear transforms performed by frequency-domain predistorter 104 and time-domain predistorter 110 may be linear transform's in which output signals may be generated from current input signals and at least some prior input signals (i.e., linear transformations with memory).

In some embodiments, multicarrier transmitter 100 may be part of a multiple-input multiple output (MIMO) multicarrier transmitter which may convey more that one data stream to more than one antenna. In these embodiments, the operations described above may be performed for power amplifiers associated with each of the antennas. In some embodiments, multicarrier transmitter 100 may be part of a wideband multicarrier transmitter and may communicate multicarrier communication signals on more than one multicarrier communication channel. More than one antenna may also be used. In these wideband embodiments, a multicarrier or an OFDM symbol may be viewed as the combination of the symbols modulated on the individual subcarriers of all the channels. A wideband channel may comprise up to four or more subchannels having bandwidths of approximately 20 MHz, and each of the subchannels may have up to 48 or more orthogonal data subcarriers having a spacing therebetween of approximately 312.5 kHz. the frequency spectrums for a wideband channel may comprise subchannels in either a 5 GHz frequency spectrum or a 2.4 GHz frequency spectrum. In these embodiments, the 5 GHz frequency spectrum may include frequencies ranging from approximately 4.9 to 5.9 GHz, and the 2.4 GHz spectrum may include frequencies ranging from approximately 2.3 to 2.5 GHz, although the scope of the invention is not limited in this respect, as other frequency spectrums are also equally suitable.

In some embodiments, multicarrier transmitter 100 may be part of a wireless communication device such as personal digital assistant (PDA), a laptop or portable computer with wireless communication capability, a web tablet, a wireless telephone, a wireless headset, a pager, an instant messaging device, a digital camera, an access point or other device that may receive and/or transmit information wirelessly. multicarrier transmitter 100 may transmit communications in accordance with specific communication standards, such as the Institute of Electrical and Electronics Engineers (IEEE) standards including IEEE 802.11(a), 802.11(b), 802.11(g/h) and/or 802.11(n) standards for wireless local area networks (WLANs) and/or 802.16 standards for wireless metropolitan area networks (WMANs), although multicarrier transmitter 100 may also be suitable to transmit communications in accordance with other techniques including the Digital Video Broadcasting Terrestrial (DVB-T) broadcasting standard, and the High performance radio Local Area Network (HiperLAN) standard. Antenna 120 may comprise a directional or omnidirectional antenna, including, for example, a dipole antenna, a monopole antenna, a loop antenna, a microstrip antenna or other type of antenna suitable for transmission of multicarrier communication signals generated by multicarrier transmitter 100.

Although some embodiments of the present invention are discussed in the context of an 802.11x implementation (e.g., 802.11a, 802.11g, 802.11n, etc.), the scope of the present invention is not limited in this respect. Some embodiments of the present invention may be implemented as part of any wireless system using multicarrier wireless communication channels (e.g., OFDM, discrete multi-tone modulation (DMT), etc.), such as may be used within, without limitation, a wireless personal area network (WPAN), a wireless local area network (WLAN), a wireless metropolitan are network (WMAN), a wireless wide area network (WWAN), a cellular network, a third generation (3G) network, a fourth generation (4G) network, a universal mobile telephone system (UMTS), and the like communication systems.

Although multicarrier transmitter 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), and combinations of various hardware and logic circuitry for performing at least the functions described herein.

Figure 2:
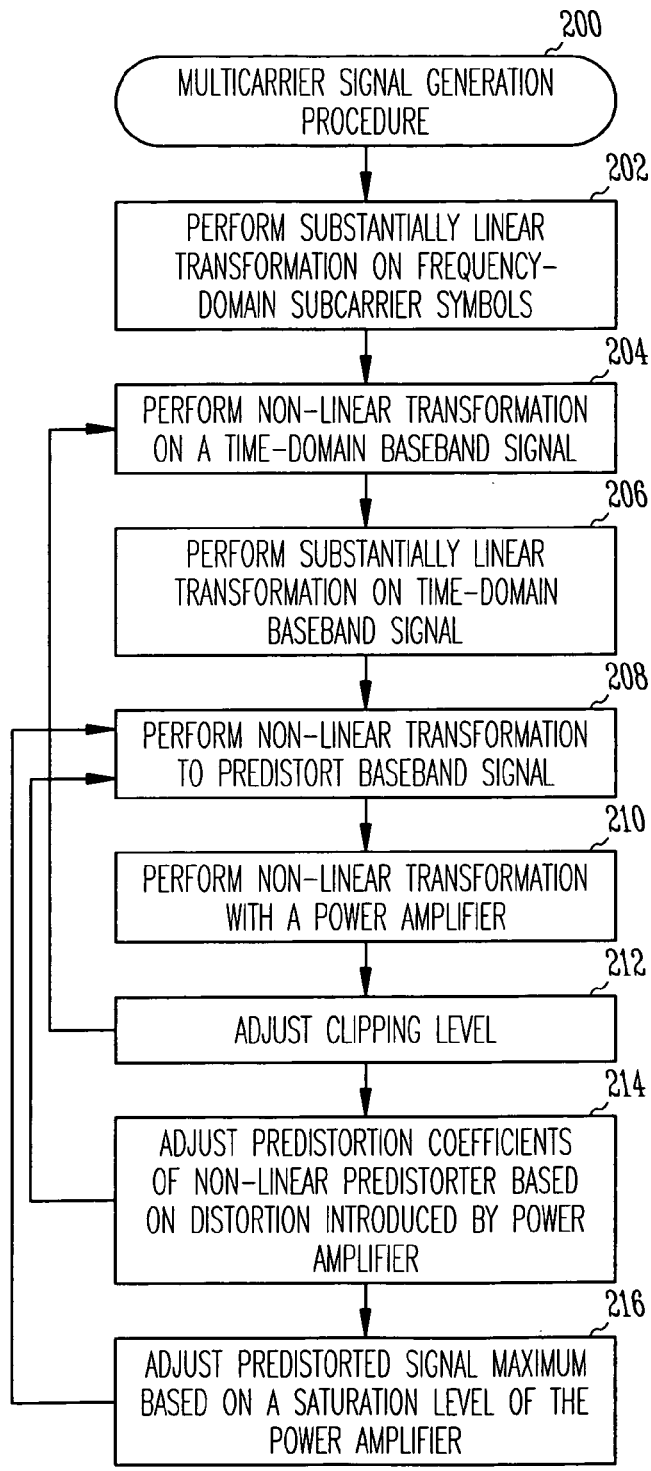
FIG. 2 is a flow chart of a multicarrier signal generation procedure in accordance with some embodiments of the present invention.

FIG. 2 is a flow chart of a multicarrier signal generation procedure in accordance with some embodiments of the present invention. Multicarrier signal generation procedure 200 generates a multicarrier signal by pre-compensating frequency-domain subcarrier symbols for substantially linear distortion subsequently introduced by time-domain baseband filtering. Multicarrier signal generation procedure 200 may be performed by a multicarrier transmitter, such as multicarrier transmitter 100 (FIG. 1), although other multicarrier transmitter configurations may also be suitable.

Operation 202 comprises performing a substantially linear transformation on the frequency-domain subcarrier symbols to generate a frequency-domain output. Operation 202 may be performed by frequency-domain predistorter 104 (FIG. 1).

Operation 204 comprises performing a non-linear transformation on a time-domain baseband signal generated by performing an IFFT on from the frequency-domain output generated in operation 202. Operation 204 may be performed by clipping circuitry 108 (FIG. 1).

Operation 206 comprises performing a substantially linear transformation on the non-linearly transformed time-domain baseband signal generated in operation 204. Operation 206 may be performed by time-domain predistorter 110 (FIG. 1). The substantially linear transformation performed on the frequency-domain subcarrier symbols in operation 202 may have a frequency transfer function which is approximately inverse to the frequency transfer function of the substantially linear transformation performed on the non-linearly transformed time-domain baseband signal performed in operation 206.

Operation 208 comprises performing a non-linear transformation on the time-domain baseband signal generated by operation 206 based on non-linear distortion that may be subsequently introduced by a power amplifier, such as power amplifier 118 (FIG. 1). Operation 208 may be performed by non-linear predistorter 112 (FIG. 1).

Operation 210 comprises performing a non-linear transformation on an upconverted and analog version of the signal generated in operation 208 with the power amplifier to generate the multicarrier signal for transmission by an antenna. Operation 210 may be performed by power amplifier 118 (FIG. 1).

Operation 212 comprises adjusting a clipping level of the non-linear transformation performed by clipping the time-domain baseband signal in operation 204. Operation 212 is optional and may be performed when a modulation type and/or the coding rate used by modulator 102 (FIG. 1) is changed. In some embodiments, operation 212 may comprise selecting different sets of complex coefficients 125 & 129 for frequency-domain predistorter 104 (FIG. 1) and time-domain predistorter 110 (FIG. 1) for different clipping levels, although the scope of the invention is not limited in this respect.

Operation 214 comprises adjusting predistortion coefficients used in operation 208 based on an amount of distortion introduced by a power amplifier. In some embodiments, operation 214 comprises adjusting predistortion coefficients used by non-linear predistorter 112 (FIG. 1) in operation 208 based on an amount of distortion introduced by power amplifier 118 (FIG. 1).

Operation 216 comprises providing a predistortion control signal to adjust a predistorted signal maximum based on a saturation level of a power amplifier that is used for subsequent amplification. In some embodiments, operation 216 comprises providing predistortion control signal 135 (FIG. 1) to non-linear predistorter 112 (FIG. 1) to adjust a predistorted signal maximum of signal 113 (FIG. 1) based on a saturation level of the power amplifier 118 (FIG. 1).

Although the individual operations of procedure 200 are illustrated and described as separate operations, one or more of the individual operations may be performed concurrently, and nothing requires that the operations be performed in the order illustrated. For example, operation 212 and 214 may be performed concurrently with operations 202 through 210.

In some embodiments, operation 202 comprises multiplying complex amplitudes of a multicarrier symbol by predetermined complex coefficients to generate a frequency-domain output, and operation 204 comprises generating a clipped time-domain baseband signal from the frequency-domain output. In these embodiments, operation 206 comprises performing a substantially linear transformation on the clipped time-domain baseband signal. The multicarrier symbol may comprise a plurality of subcarrier symbols, and each subcarrier symbol may be associated with one of a plurality of subcarriers of a multicarrier communication channel. In these embodiments, one of the predetermined complex coefficients may be provided for each subcarrier of the multicarrier channel.

In some embodiments, operation 202 comprises multiplying complex amplitude of each of the subcarrier symbols by an associated one of the predetermined complex coefficients, and in operation 206, the substantially linear transformation performed on the clipped time-domain baseband signal provides a frequency response approximately inverse to the substantially linear transformation performed by multiplying complex amplitudes in operation 204.

In some embodiments, operation 204 may include performing an inverse fast Fourier transform to generate a time-domain baseband signal from the frequency-domain output, and clipping the time-domain baseband signal to reduce signal peaks. In some embodiments, operation 212 may provide a clipping level input to adjust a clipping level based on a saturation level of the power amplifier used for subsequent amplification, currently needed transmit power, maximum ripple of time-domain filter step response function, modulation type and coding rate of the subsequently transmitted multicarrier or OFDM signal.

In some embodiments, operation 208 comprises pre-distorting the substantially linear transformed clipped time-domain baseband signal to, at least in part, compensate for non-linear distortion introduced subsequently by the power amplifier.

Figure 3:
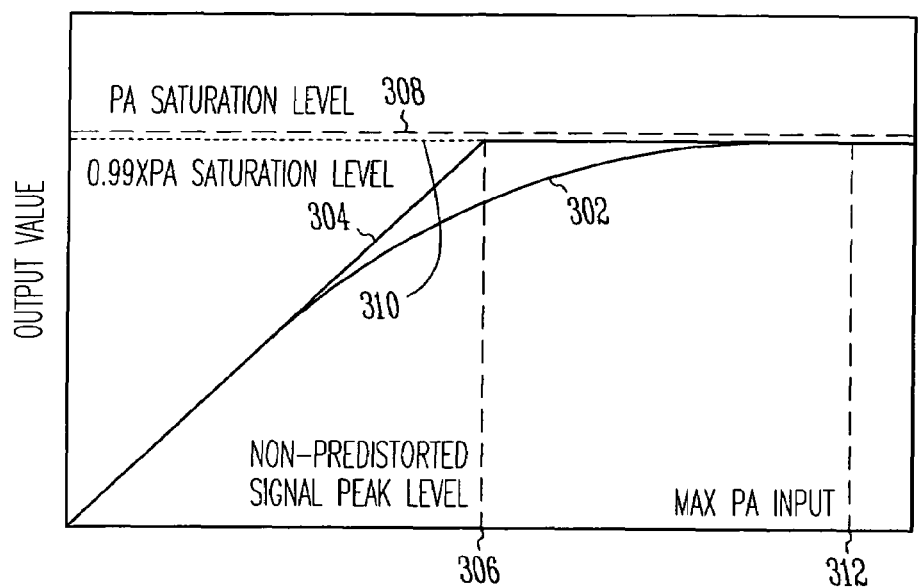
FIG. 3 illustrates transfer functions of power amplifiers.

FIG. 3 illustrates power amplifier transfer functions. Transfer function 302 is an example of a power amplifier transfer without linearization. Transfer function 304 is an example of a transfer function of a non-linear predistorter and a power amplifier (e.g., non-linear predistorter 112 (FIG. 1) and power amplifier 118 (FIG. 1)) in accordance with some embodiments of the present invention. As illustrated, maximum power amplifier input level 312 may be selected so that power amplifier 118 (FIG. 1) may operate within a predetermined percent of saturation level 308. FIG. 3 illustrates maximum power amplifier input 312 selected for operation at 99% saturation level 310; however other levels are also suitable.

As can be seen, multicarrier transmitter 100 (FIG. 1) implements predistortion linearization techniques which may enhance the performance of non-linear predistorter 112 by using preliminary signal clipping and subsequent filtering out spectral regrowth components. These linearization techniques predistort the baseband signal and result in a reduction of out-of-band signal components and a decrease of the error of in-band components in the signal spectrum. These linearization techniques may also increase the efficiency of a non-linear power amplifier (i.e., power amplifier 118 (FIG. 1)) by decreasing the output back-off.

In general, power amplifier 118 (FIG. 1) may introduce non-linear distortions to a signal especially when it operates near maximum output power. Achieving linear amplification by operating far from saturation level (i.e., with large power back-offs) is power inefficient. An "ideal" power amplifier has an angle-like transfer function that provides minimum relative constellation root mean square (RMS) error or average error vector magnitude (EVM) for a given power-amplifier back-off from the saturation level. The RMS error measures the in-band distortion of the original signal. When an "ideal" power amplifier operates in a power efficient, small back-off regime, the transmit spectrum restrictions for out-of-band emissions may be violated. The large spectral regrowth may be due to sharp saturation of the angle transfer function of the power amplifier. Because a power amplifier's output may be a full-power radio-frequency signal, it is generally inefficient to cancel out-of-band components in the signal path after operation of the power amplifier.

In accordance with embodiments of the present invention, multicarrier transmitter 100 (FIG. 1) may avoid spectral regrowth induced by the power amplifier because the non-linear transformation (which may cause spectrum widening) is shifted to baseband, as described above. Undesired spectrum components are cut-off and a predistorted signal is applied to a more linear region of power amplifier 118 (FIG. 1). In some embodiments, the parameters of frequency-domain predistorter 104 (FIG. 1), clipping circuitry 104 (FIG. 1), time-domain predistorter 110 (FIG. 1) and non-linear predistorter 112 (FIG. 1) may be selected to place the signal's dynamic range just within the linear region of the predistorted power amplifier. This may help ensure that little or no additional spectral regrowth occurs due to power amplifier 118, although the scope of the invention is not limited in this respect. As a result, the frequency-domain filtering, clipping and time-domain filtering prior to non-linear predistortion may result in a significant decrease in the out-of-band radiation and the RMS for in-band components of signal spectrum in comparison with some conventional predistortion schemes.

In some embodiments, non-linear predistorter 112 (FIG. 1) may predistort signal 111 (FIG. 1) by implementing the following transfer function:

$$V_{pr}(V_{in}) = F^{-1}(G_0 V_{in}),$$

In this equation, $V_{in}$ represents an input complex baseband signal, $V_{pr}$ represents an output complex baseband signal, $G_0$ represents the power amplifier's gain, $V_p = F(V_{in})$ represents the power amplifier transfer characteristic, and $F^{-1}(\ldots)$ represents a function inverse to $F(V_{in})$. In some embodiments, this operation may compensate amplitude modulation (AM) to AM distortion and, if needed, AM to phase modulation (PM) distortion that may emerge in power amplifier 118 (FIG. 1). This predistortion may be implemented as transformation of the incoming complex signal with the help of complex coefficients that may be stored in a look-up table or by using polynomial expansion of inverse function $F^{-1}(G_0 V_{in})$.

The combination of the non-linear predistorter 112 (FIG. 1) and power amplifier 118 (FIG. 1) may provide a transfer function close to angle transfer function 304 (FIG. 3). The maximum power amplifier output 310 (99% of the power amplifier's saturation level 308) may be determined by the maximum power amplifier input 312, and the power amplifier's transfer function.

Because of temperature variation and/or component aging, the power amplifier's characteristics may change. To help compensate for changes in characteristics of power amplifier 118 (FIG. 1), a sample output signal, signal 139 (FIG. 1), may be down converted back to baseband, digitized and compared with signal 113 (FIG. 1), the original signal from non-linear predistorter 112 (FIG. 1), and used to modify the parameters used by non-linear predistorter 112 (FIG. 1). In some embodiments, a look-up table's content may be modified. In other embodiments, coefficients of a polynomial expansion of the inverse function $F^{-1}(G_0 V_{in})$ may be modified.

As can be seen, multicarrier transmitter 100 (FIG. 1) realizes complex non-linear predistortion with memory. The entire transformation may be implemented as a sequence of linear and non-linear transformations as described in FIG. 2.

Figure 4:
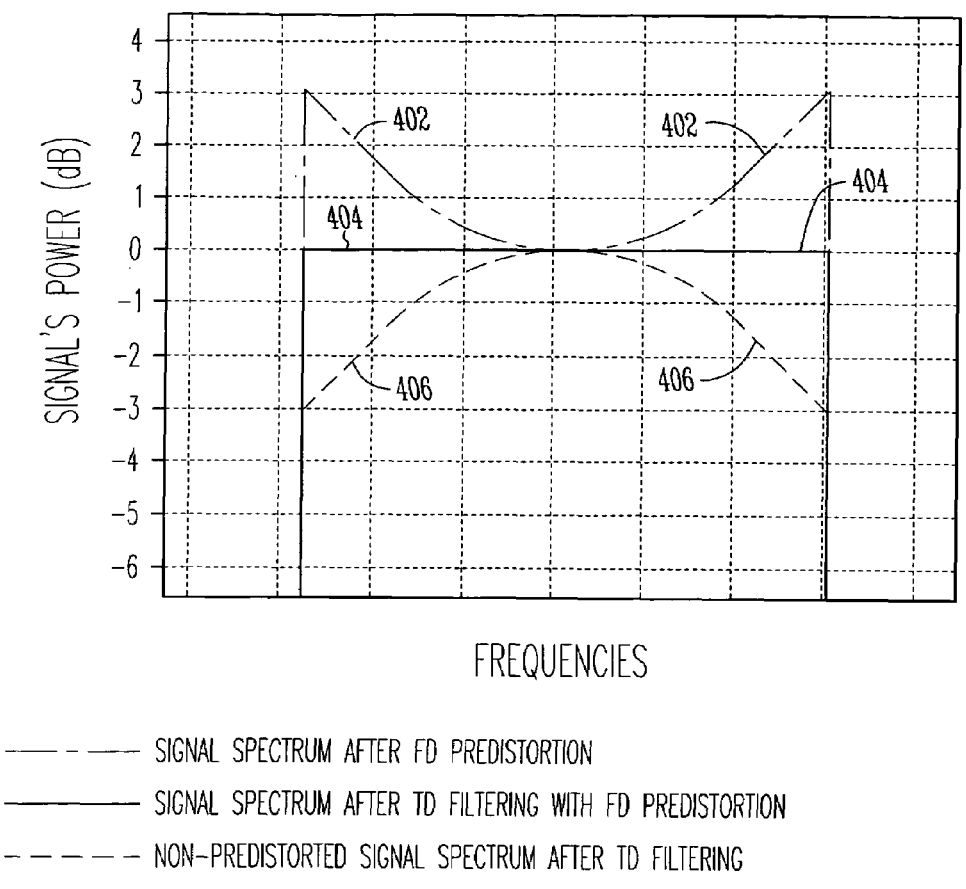
FIG. 4 illustrates examples of frequency spectrum transformation performed by frequency-domain predistortion and time-domain predistortion in accordance with embodiments of the present invention.

FIG. 4 illustrates examples of frequency spectrum transformation performed by frequency-domain predistortion and time-domain predistortion in accordance with embodiments of the present invention. Signal spectrum 402 illustrates a signal spectrum of signals, such as frequency-domain subcarrier symbols 105 (FIG. 1), after operation of frequency-domain predistorter 104 (FIG. 1). Signal spectrum 404 illustrates a signal spectrum of signals, such as digital signal output 111 (FIG. 1), after operation of time-domain predistorter 110 (FIG. 1) with the linear transformation performed by frequency-domain predistorter 104 (FIG. 1). Signal spectrum 406, on the other hand, illustrates a signal spectrum of signals, such as digital signal output 111 (FIG. 1), after operation of time-domain predistorter 110 (FIG. 1) without the linear transformation performed by frequency-domain predistorter 104 (FIG. 1). As can be seen, signal spectrum 406 has a lower signal power at higher and lower subcarrier frequencies violating the requirements of transmitter spectral flatness.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, computing device includes one or more processing elements coupled with computer-readable memory that may be volatile or non-volatile memory or a combination thereof.

Embodiments of the invention may be implemented in one or a combination of hardware, firmware and software. Embodiments of the invention may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disk storage media, optical storage media, flash-memory devices, electrical, optical, acoustical or other form of propagated signals (e.g., carrier waves, infrared signals, digital signals, etc.), and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention may lie in less than all features of a single disclosed embodiment. Thus the following claims are hereby incorporated into the detailed description, with each claim standing on its own as a separate preferred embodiment.

What is claimed is:

1. A multicarrier transmitter comprising:
   a frequency-domain predistorter to multiply frequency domain subcarriers of an orthogonal frequency division multiplexed symbol(OFDM) symbol by complex coefficients;
   clipping circuitry to clip a time-domain baseband signal transformed from a frequency-domain output of the frequency-domain predistorter; and a time-domain predistorter to perform low-pass filtering on the clipped time-domain baseband signal, wherein after the operation of the frequency-domain predistorter, an inverse fast Fourier transform is performed to transform the frequency-domain output of the frequency-domain predistorter to the time-domain baseband signal for the clipping circuitry, the time-domain baseband signal having frequency components of the OFDM symbol.

2. A multicarrier transmitter comprising:

a frequency-domain predistorter to multiply complex amplitudes of a multicarrier symbol by complex coefficients;

clipping circuitry to clip a time-domain baseband signal transformed from a frequency-domain output of the frequency-domain predistorter; and a time-domain predistorter to perform low-pass filtering on the clipped time-domain baseband signal, wherein the frequency-domain predistorter performs a substantially linear transformation by multiplying a complex amplitude of each of a plurality of subcarrier symbols by an associated one of the complex coefficients, and wherein the time-domain predistorter performs a substantially linear transformation on the clipped time-domain baseband signal providing a frequency transfer function approximately inverse to a frequency transfer function of the frequency-domain predistorter.

3. The transmitter of claim 2 wherein the complex coefficients are selected to provide a frequency transfer function of the frequency-domain predistorter approximately inverse to a frequency transfer function of the time-domain predistorter for in-band signal components.

4. The transmitter of claim 2 further comprising an adaptation and control unit to provide a clipping level input to the clipping circuitry for selection of a clipping level, wherein the time-domain predistorter performs the substantially linear transformation based on a set of complex coefficients, and wherein the adaptation and control unit selects different sets of complex coefficients for both the frequency-domain predistorter and the time-domain predistorter for different modulation types and coding rates associated with the subcarrier symbols.

5. The transmitter of claim 4 further comprising a coefficient storage element to store the different sets of complex coefficients for use by the time-domain predistorter and for use by the frequency-domain predistorter, wherein at least some of the complex coefficients are different for at least some of the subcarriers.

6. The transmitter of claim 2 wherein the multicarrier symbol comprises the plurality of subcarrier symbols, each subcarrier symbol being associated with one of a plurality of subcarriers of a multicarrier communication channel, and wherein one of the complex coefficients is provided for each subcarrier of the multicarrier channel.

7. The transmitter of claim 6 wherein the transmitter comprises circuitry to generate an orthogonal frequency division multiplexed signal comprising a plurality of substantially orthogonal symbol-modulated subcarriers, wherein each subcarrier symbol is associated with one of the orthogonal symbol-modulated subcarriers of the orthogonal frequency division multiplexed signal.

8. The transmitter of claim 2 further comprising a non-linear predistorter to pre-distort a digital signal output from the time-domain predistorter to, at least in part, compensate for non-linear distortion introduced subsequently by a power amplifier, the non-linear predistorter to provide a predistorted output signal for subsequent amplification by the power amplifier.

9. The transmitter of claim 8 wherein the non-linear predistorter adjusts a predistorted signal maximum of the predistorted output signal to achieve an output level of the power amplifier which is predetermined percentage of a saturation level of the power amplifier.

10. The transmitter of claim 9 further comprising an adaptation and control unit to provide a predistortion control signal to the non-linear predistorter to adjust the predistorted signal maximum of the predistorted output signal to achieve an output level of the power amplifier which is the predetermined percentage of the saturation level of the power amplifier.

11. The transmitter of claim 10 wherein the adaptation and control unit is to generate the predistortion control signal by a comparison of a sampled output from the power amplifier with the digital signal output of the time-domain predistorter.

12. The transmitter of claim 10 wherein the adaptation and control unit is to generate the predistortion control signal by a comparison of a sampled output from the power amplifier with the digital signal output of the time-domain predistorter.

13. The transmitter of claim 10 wherein the non-linear predistorter performs a non-linear transformation based on predistortion coefficients to pre-distort the digital signal output from the time-domain predistorter, and wherein the adaptation and control unit is to adjust the predistortion coefficients used by the non-linear predistorter in response to changes in a transfer function of the power amplifier including changes in a saturation level of power amplifier.

14. The multicarrier transmitter comprising:

a frequency-domain predistorter to perform a substantially linear transformation on frequency-domain samples comprising a multicarrier symbol;

clipping circuitry to perform a non-linear transformation on a time-domain baseband signal generated from linearly transformed frequency domain samples provided by the frequency-domain predistorter;

a time-domain predistorter to perform a substantially linear transformation on a clipped time-domain baseband signal provided by the clipping circuitry; and a non-linear predistorter to perform a non-linear transformation on linearly transformed clipped time-domain signals provided by the time-domain predistorter.

15. The transmitter of claim 14 further comprising a power amplifier to perform a non-linear transformation by amplifying an upconverted analog version of output signals provided by the non-linear predistorter, wherein the transformation performed by the frequency-domain predistorter is approximately inverse to the transformation performed by the time-domain predistorter.

16. The transmitter of claim 15 wherein the non-linear predistorter is to pre-distort a digital signal output from the time-domain predistorter to, at least in part, compensate for non-linear distortion introduced subsequently by a power amplifier, and wherein the non-linear predistorter is to provide a predistorted output signal for subsequent amplification by the power amplifier.

17. The transmitter of claim 16 wherein the non-linear predistorter adjusts a predistorted signal maximum of the predistorted output signal to achieve a maximum output level of the power amplifier which is a predetermined percentage of a saturation level of the power amplifier, and wherein the transmitter further comprises an adaptation and control unit to provide a predistortion control signal to the non-linear predistorter to adjust the predistorted signal maximum of the predistorted output signal to achieve the maximum output level of the power amplifier which is the predetermined percentage of the saturation level of the power amplifier.

18. The transmitter of claim 17 wherein the adaptation and control unit is to generate the predistortion control signal by comparing a sampled output from the power amplifier with the digital signal output of the time-domain predistorter.

19. The transmitter of claim 17 wherein the adaptation and control unit is to generate the predistortion control signal by a comparison of a sampled output from the power amplifier with the digital signal output of the non-linear predistorter.

20. The transmitter of claim 17 wherein the non-linear predistorter performs a non-linear transformation based on predistortion coefficients to pre-distort the digital signal output from the time-domain predistorter, and wherein the adaptation and control unit is to adjust the predistortion coefficients used by the non-linear predistorter in response to changes in a transfer function of the power amplifier including changes in a saturation level of power amplifier.

21. A method for generating a multicarrier communication signal comprising:

performing a substantially linear transformation on frequency-domain samples comprising a multicarrier symbol with a frequency-domain predistorter;

transforming frequency domain samples provided by the frequency-domain predistorter to generate a time-domain baseband signal;

performing a non-linear transformation on the time-domain baseband signal with clipping circuitry;

performing a substantially linear transformation with a time-domain predistorter on a clipped time-domain baseband signal provided by the clipping circuitry; and performing a non-linear transformation with a non-linear predistorter on linearly transformed clipped time-domain signals provided by the time-domain predistorter.

22. The method of claim 21 further comprising performing a non-linear transformation with a power amplifier by amplifying an upconverted analog version of output signals provided by the non-linear predistorter, wherein the transformation performed by the frequency-domain predistorter is approximately inverse to the transformation performed by the time-domain predistorter.

23. The method of claim 22 further comprising:

pre-distorting, with the non-linear predistorter, a digital signal output from the time-domain predistorter to, at least in part, compensate for non-linear distortion introduced subsequently by a power amplifier; and providing a predistorted output signal for subsequent amplification by the power amplifier.

24. The method of claim 23 further comprising:

adjusting, by the non-linear predistorter, a predistorted signal maximum of the predistorted output signal to achieve a maximum output level of the power amplifier which is a predetermined percentage of a saturation level of the power amplifier; and providing a predistortion control signal to the non-linear predistorter to adjust the predistorted signal maximum of the predistorted output signal to achieve the maximum output level of the power amplifier which is the predetermined percentage of the saturation level of the power amplifier.

* * * * *

UNITED STATES PATENT AND TRADEMARK OFFICE
CERTIFICATE OF CORRECTION

PATENT NO. : 7,463,697 B2  Page 1 of 1
APPLICATION NO. : 10/953206
DATED : December 9, 2008
INVENTOR(S) : Maltsev et al.

It is certified that error appears in the above-identified patent and that said Letters Patent is hereby corrected as shown below:

Title page, Item (75), "Inventors", delete "Norgorod" and insert -- Novgorod --, therefor.

Title page, Item (74), "Attorney, Agent, or Firm", delete "Gergory J. Gorris" and insert -- Gregory J. Gorrie --, therefor.

Signed and Sealed this

Twenty-fourth Day of February, 2009

JOHN DOLL
*Acting Director of the United States Patent and Trademark Office*